United States Patent [19]
Golliher

[11] Patent Number: 5,407,113
[45] Date of Patent: Apr. 18, 1995

[54] OVER THE HEAD HANDS-FREE PHONE HOLDER

[75] Inventor: Clayton R. Golliher, 804 N. Harvard, Hollywood, Calif. 90029

[73] Assignee: Clayton R. Golliher, Hollywood, Calif.

[21] Appl. No.: 191,936

[22] Filed: Feb. 4, 1994

[51] Int. Cl.⁶ .............................................. H04M 1/05
[52] U.S. Cl. .................... 224/181; 224/901; 379/430
[58] Field of Search ................ 224/101, 181, 901; 379/430, 449; D14/192, 229, 251, 253; D8/44; D3/215, 218

[56] References Cited

U.S. PATENT DOCUMENTS

| | | | |
|---|---|---|---|
| 1,951,332 | 3/1934 | Barclay | 379/430 |
| 2,360,027 | 10/1944 | Werner | 379/430 |
| 2,460,458 | 2/1949 | Korbin | 224/181 |
| 2,481,387 | 9/1949 | Bonecutter | 379/430 |
| 2,598,928 | 6/1952 | McCorkell | 379/430 |
| 3,136,854 | 6/1964 | Willick | 379/430 |
| 4,048,453 | 9/1977 | Seidel | 379/430 |
| 4,367,378 | 1/1983 | Jordan | 379/430 |
| 4,648,130 | 3/1987 | Kuznetz | 224/181 |
| 4,821,317 | 4/1989 | Wong | 379/430 |

FOREIGN PATENT DOCUMENTS 47250  2/1987  Japan .................... 379/430

Primary Examiner—Henry J. Recla
Assistant Examiner—Gregory M. Vidovich

[57] ABSTRACT

An over the head hands-free phone holder comprising of an elongated strap with first and second ends each having a first adhesive fastener connected thereto, and second adhesive fasteners connected to the first and second ends of a telephone and/or phone receiver wherein the first adhesive fasteners respectfully mate with the second adhesive fasteners to secure the telephone about the head of the individual in a hands free relation. The adhesive fasteners are of hook and loop formation. The strap consists of a large oval hole conformed to fit over the rear, top portion of the head of an individual and a small oval hole which facilitates two modes of attatchment to the telephone receiver. The phone holder strap is also fully adjustable to a variety of head sizes, and for use on the left or right ear of an individual, and adaptable for use on a variety of telephones and/or phone receivers.

1 Claim, 1 Drawing Sheet

OVER THE HEAD HANDS-FREE PHONE HOLDER

FIELD OF INVENTION

The present invention relates to the telephone and holds the telephone and/or phone receivers comfortably and securely to a persons ear and mouth.

CROSS-REFERENCE TO RELATED APPLICATIONS

A commonly assigned design application Ser. No. 29/008,734, filed Feb. 16, 1993, is currently being sought.

BACKGROUND OF INVENTION

It has been the conventional practice to hold the telephone and/or phone receiver to the mouth and ear with the use of the hand. Difficulties are encountered if the phone user is handicapped in the hands and/or arms and can't hold the phone or if the phone user needs their hands free to do other work. Our "hands-free" phone holder allows the phone to be used independently from the use of the hands. Two other main types of phone holders have been previously developed; one being the shoulder rest for a phone receiver and the other being the telephone headset. The disadvantages of the shoulder rest type phone holder are;

(1) they tend to make the neck sore or may cause a neck injury,
(2) they can be used only on certain types of phones and,
(3) they are restrictive to the user in that they restrict the neck, head, and shoulders from free movement.

The drawbacks of the headset type device are;

(1) they are designed to work on only special phone systems,
(2) they are restrictive in that the phone user, in most cases, is confined to a close proximity to the telephone unit and,
(3) they are expensive.

Therefore a long standing need has existed to provide a simple, low cost, novel, phone holder that would adapt to almost any phone and would comfortably, unrestrictedly, yet securely hold the phone to the users' mouth and ear. This new phone holder, that could be removed and replaced in seconds, would allow the users' hands, neck, and head to move freely and independently and would free the user from holding the phone. A search of other telephone and/or phone receiver holders was conducted and revealed no prior art like ours.

SUMMARY OF THE INVENTION

The problem and difficulties outlined above are obviated by the present invention which provides a simple, novel, phone holder which will comfortably, unrestrictedly, yet securely hold almost any phone completely hands free. This phone holder can be easily removed and replaced on and off the phone and works well on such phones as, office phones, home phones, cordless phones, mobile cellular phones, and hand held cellular phones. The phone holder comes in a kit comprising of two separate adhesive patches and the phone holder strap. The patches may be fashioned of a locking, hook and loop type material such as Velcro. The strap can be made of a number of different flexible material and is equipped with the corresponding fastening material. The patches are adhered to the back of the phone and/or phone receiver. One patch is placed at the top of the phone and/or receiver and the other patch is placed near the bottom.

The "V-shaped" end of the strap is is secured to the top patch on the phone and/or receiver and the large hole then fits comfortably over the rear top of the users head. This unique hole is specially engineered to universally fit most any persons head. The opposite end of the phone holder strap then proceeds down the opposite side of the users head locating itself just under the chin.

The strap may be attached one of two ways to the bottom of the phone. Using the first method of attatchment the strap proceeds entirely around the bottom inside portion of the phone and/or phone receiver. Using the second method the small hole at the bottom of the strap straddles the inside, bottom corner of the phone and/or phone receiver. In both cases the end of the strap is then fastened to the "Velco like" fastening patch which is located on the bottom outside portion of the phone and/or phone receiver.

Therefore, it is among the primary objects of the present invention to provide a novel phone holder that can be easily attatched and detatched and therefore be used on a plurality of phones and/or phone receivers. If the strap is not in use it can be compressed and stored easily in a drawer, a glove box, a pocket etc.

Another object of the present invention is to provide a novel phone holder which will allow the user to quickly and easily change the use of the phone from one ear to the other. This is accomplished by first removing the phone from the head, then rotating the "V-shaped" end of the strap approximately 45 degrees and reattatching it to the phone and/or receiver. The strap is simply rotated to the left for the left ear and to the right for the right ear.

Another object of the present invention is that our phone holder will adjust to fit most any head size. This is accomplished by adjusting the "V-shaped" end of the strap up or down along the length of the phone and/or phone receiver.

Yet a further object of the present invention is to provide a novel phone holder which is economical to manufacture with minimal tooling and manufacturing costs.

OUTLINE OF DRAWINGS

The features of the present invention which are believed to be novel, are set forth with particularity in the appended claims. The present invention both as to its organization, and its manner of operation, together with further objects and advantages thereof, may best be understood with reference to the following description, taken in connection with the accompanying drawings in which:

FIG. 1 is a reduced perspective view of the phone holder.

FIG. 2 is a side elevatioal view of the phone holder.

FIG. 3 is a rear end view thereof.

FIG. 4 is a view of the right side of the head with the phone on the left ear.

FIG. 5 is a view of the left side of the head with the phone on the right ear.

FIG. 6 is a view of the right side of the head with the phone on the left ear illustrating another method of use of the phone holder.

FIG. 7 is a view of the left side of the head with the phone on the right ear.

FIG. 8 is an exploded perspective view showing each end of the phone holder strap and its attatchment to the phone.

REFERENCE NUMERALS IN DRAWINGS

(10) Loop type fastening patch
(12) Loop type fastening patch
(14) Hook type fastening patch
(16) Hook type fastening patch
(18) V-shaped end
(20) Small end with finger tab
(22) Large oval hole
(24) Small oval hole

DESCRIPTION OF DRAWINGS

A typical embodiment of the present invention is illustrated in FIG. 1, (top view) FIG. 2, (side view) and FIG. 3 (end view). FIG. 1 also shows the V-shaped end (18) and the small end with finger tab (20). FIG. 1 also shows the hook type fastening patches (14) & (16) on the-phone holder strap.

FIGS. 4 & 5 show the phone holder used with the small oval hole (24) proceeding around bottom, inside portion of the phone and/or receiver. FIGS. 6 & 7 show the small oval hole (24) straddling the inside bottom corner of the phone and/or receiver.

OPERATION

Figure 1:
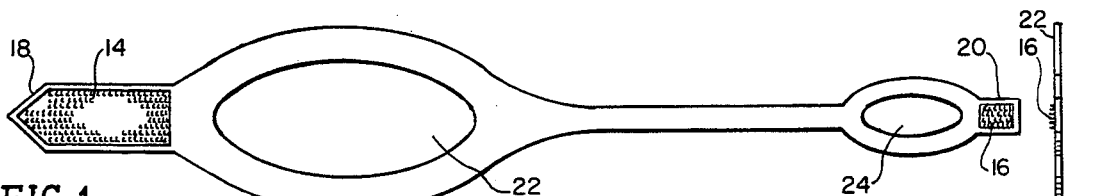
FIG. 1 shows the phone holder strap with large oval hole (22) and the small oval hole (24).
Figures 2, 3:
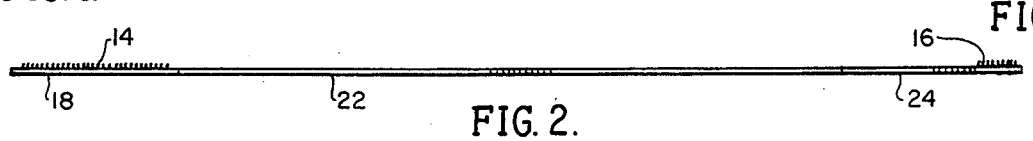
Figure 8:
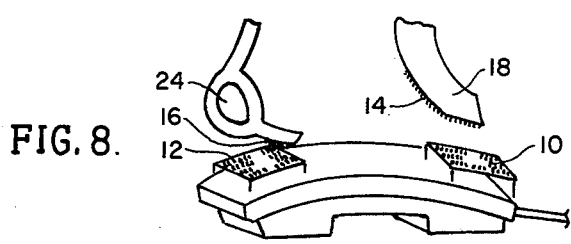
FIG. 8 is an exploded perspective view of the phone holder showing how the ends of the phone holder strap are fastened to the top and bottom of the phone and/or receiver using the hook and loop type fastening patches.

Referring to FIG. 1, and FIG. 8, the present invention comes in a kit comprising of two pressure sensitive, adhesive loop type fastening patches (10) & (12) and an elongated phone holder strap equipped with one hook type fastening patch at each end of the strap (14) & (16). The strap is also fashioned with a large oval hole (22) and a small oval hole (24), a V-shaped end (18) and a small end with finger tab (20).

Figures 4, 5:
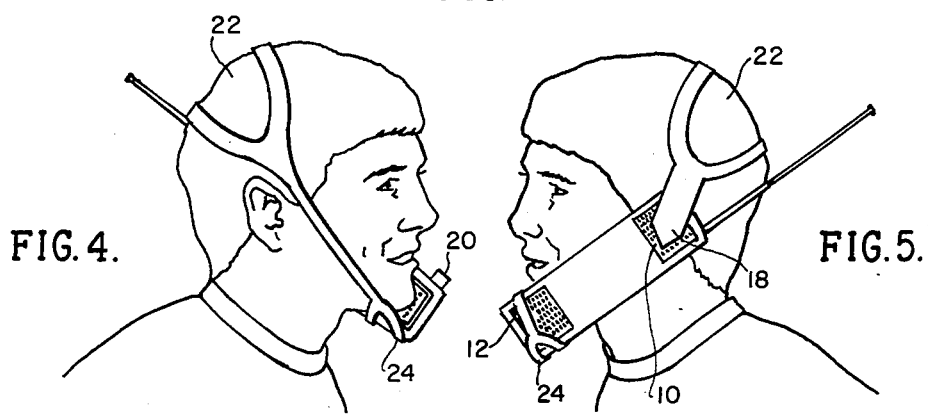
FIGS. 4, 5, 6, & 7 show the phone holder in operation.
Figures 6, 7:
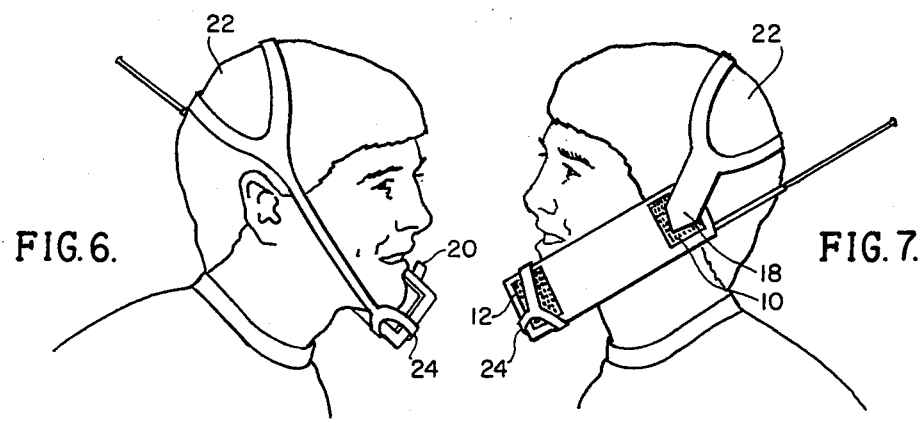

One loop type patch (10) is fastened to the top of the back of the phone and/or receiver and the other loop type patch (12) is fastened to the back of the phone and/or receiver ¾" from the bottom. The V-shaped end (18) of the strap is very important, in that it is uniquely engineered to set the correct angle of attatchment to the phone and/or receiver. The lower edge of the V-shaped end (18) should always parallel the lower edge of the phone and/or receiver as shown in FIGS. 5 & 7.

The phone holder may be adjusted to facilitate use on either ear as follows: With the phone and/or receiver held vertically and with the back of the phone and/or receiver facing the user, the V-shaped end (18) of the strap—equipped with the hook type patch (14)—is fastened to the loop type patch (10) on the top back of the phone. For use on the left ear, the body of the strap proceeds to the left of the phone and/or phone receiver and for use on the right ear, the V-shaped end is simply rotated approximately 45 degrees to the right, and attatched in the same fashion, with the body of the strap proceeding to the right of the phone and/or phone receiver.

The V-shaped end of the phone holder is also unique in that it is designed to be adjustable to fit most any different head size. The phone holder is adjusted to suit smaller and larger head sizes as follows: With the phone and/or phone receiver held vertically and with the back of the phone and/or phone receiver facing the user, the V-shaped end (18) of the strap is removed from the phone and/or receiver and simply moved up and down along the length of phone and/or phone receiver and then reattatched. The V-shaped end (18) is attatched higher for larger head sizes and lower for smaller head sizes.

The phone and/or receiver is now secured to the users head as follows: With the V-shaped end (18) of the strap already attatched to the phone and/or phone receiver, the phone and/or phone receiver is held to the users head in the conventional manner and the small end with finger tab (20) is grasped with the opposite hand. The strap is now extended over the top of the users' head with the large oval hole (22) comfortably fitting over the top back of the users' head as shown in FIGS. 4, 5, 6 & 7. The large oval hole is unique in that it is designed to comfortable fit most every head size. The strap now extends down the opposite side of the users head and is fastened to the loop type fastening patch (12) located at the bottom of the phone and/or phone receiver.

The small end with finger tab (20) may be fastened to the phone and/or phone reciever in one of two ways as follows: Using the first method of attatchment shown in FIGS. 4 & 5, the small end of the strap (20) is extended under the users' chin and proceeds completely around the bottom inside portion of the phone and/or phone receiver, and the hook type fastening patch (16) located on the small end of the strap (20) is then fastened to the loop type fastening patch (12) located near the bottom of the phone and/or phone receiver.

Using the second method of attatchment shown in FIGS. 7 & 8, the small hole (24) located at the small end of the strap (20) straddles the bottom inside corner of the phone and/or phone receiver, and the hook type fastening patch (16) located on the small end of the strap (20) is then fastened to the loop type fastening patch (12) located on the bottom of the phone and/or phone receiver. The small oval hole is uniquely engineered to straddle the bottom inside corner of most every phone and/or phone receiver.

While particular embodiments of the present invention have been shown and described herein, it will be obvious to those skilled in this art that changes and modifications may be made without departing from this invention in its broader aspects and therefore the aim in the appended claims is to cover all such changes and modifications as fall within the true spirit and scope of this invention.

IN CONCLUSION

Thus the reader will observe that this "hands-free" phone and/or phone reveiver holder is simple and easy to use. It is a comfortable and functional device specially engineered to be fully adjustable and to hold almost any phone and/or phone receiver securely and unrestrictedly to the users' head, and to be adaptable for use on either ear. The present invention is economical to produce and can be used by persons of almost any age and/or head size.

What is claimed is:

1. A phone holder kit adapted to conform to an individual's head and adapted to hold a telephone for use on either the right or left ear of the individual, said telephone having opposite top and bottom ends, a back side and a front side wherein the front side faces the individuals head and the top end is adjacent the individual's ear when the telephone is in a use position, said kit comprising:

first and second adhesive patches, said patches formed of hook or pile fastening material, said first and second patches adapted to be connected to said top and bottom ends on said back side of said telephone, respectively, an elongate, flexible strap adapted to conformly fit over the top portion of an individual's head, said strap having opposite first and second ends, an inner side and an outer side, said first and second ends on said inner side of said strap including first and second adhesive patches respectively connected thereto formed of the opposite of said hook or pile fastening material, said strap further including a first substantially oval hole shaped to conform to the top of the individual's head extending through said strap proximate said first end of said strap and a second substantially oval hole smaller than said first hole extending through said strap proximate said second end of said strap, wherein, in use, said strap is placed over the individual's head, said first hole being fit over the top of the individual's head and said second end of said strap being located proximate the chin of the individual, said first and second patches of said strap being connected to said first and second patches connected to said telephone, respectively, and said bottom end of said telephone being lodged within said second hole of said strap to provide a secure means of holding a telephone about the individual's head in a hand-free relation.

* * * * *